United States Patent [19]
Schijf

[11] 3,785,209
[45] Jan. 15, 1974

[54] PRESSURE GAUGE

[75] Inventor: Johannes Schijf, Delft, Netherlands

[73] Assignee: Nederlandse Organisatie Voor Toegepast Natuurwetenschappelijk Onderzoek Ten Hehoeve Van Nijverheld, Handel en Verkeer, The Hague, Netherlands

[22] Filed: Oct. 28, 1971

[21] Appl. No.: 193,508

[30] Foreign Application Priority Data
Oct. 29, 1970 Netherlands....................... 7015908

[52] U.S. Cl. ............................................... 73/395
[51] Int. Cl. ............................................... G01l 7/00
[58] Field of Search............... 73/395, 398 AR, 406; 338/4, 42

[56] References Cited
UNITED STATES PATENTS
2,472,045   5/1949   Gibbons........................ 73/398 AR Primary Examiner—Donald O. Woodiel
Attorney—Hammond & Littell

[57] ABSTRACT

A pressure gauge for extrusion and injection moulding machines, in which a push rod connects a membrane at one end and a displacement meter at the other end of the casing. The usual thermal sensitivity of this kind of pressure gauges has been suppressed by the use of a hollow, thin-walled push rod that fits in the casing with a narrow clearance.

5 Claims, 2 Drawing Figures

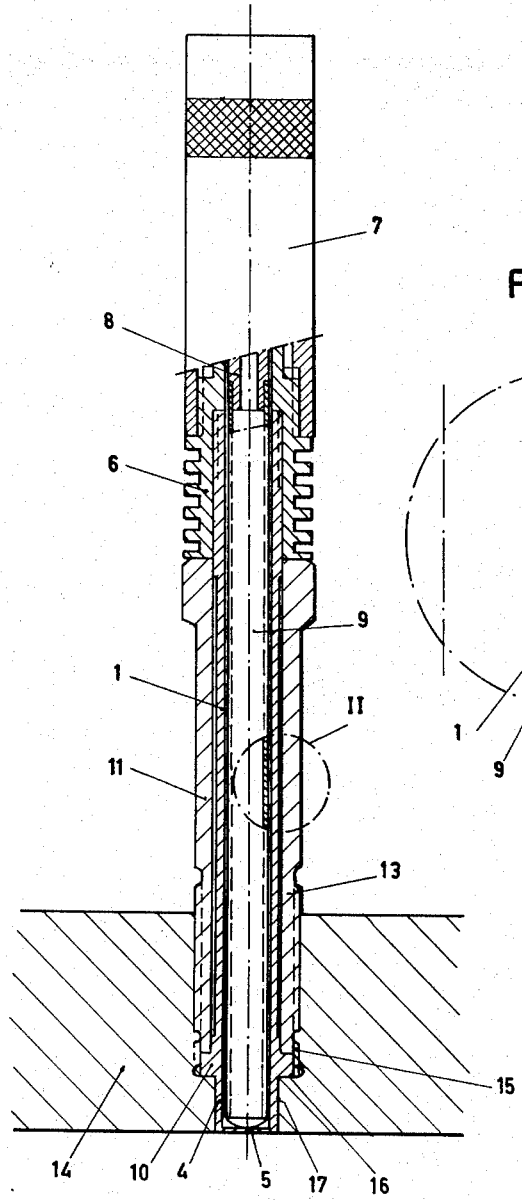
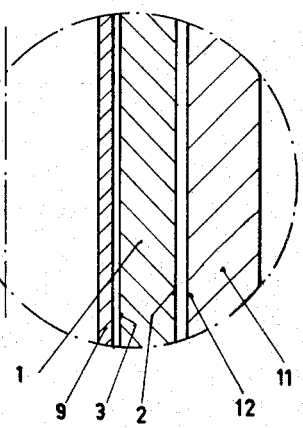

PRESSURE GAUGE

The invention relates to a pressure gauge, in particular for measurements at extrusion and injection moulding of thermoplasts and similar materials, comprising a substantially tubular casing, a pressure feeler closing said casing at its one end and deforming elastically under the influence of the pressure to be measured and a displacement meter provided at the other end of said casing and a push rod coaxial with said casing and connecting said displacement meter with said pressure feeler.

Pressure gauges of this type known in the art are highly sensitive to the changes in the ambient temperature that are unavoidable because at conventional extrusion and injection moulding machines the external heating and cooling are constantly switched on and off by an automatic temperature control.

The temperature fluctuations the casing of the pressure gauge is subject to, are also transmitted to the push rod. The pertinent transmission of heat between the casing and the push rod requires some time, however, because of the thermic resistance between the casing and the push rod. Owing to this temperature changes in the push rod lag behind those of the casing and there is an ever changing difference in temperature between the casing and the push rod. The relative changes in length of the push rod in respect of the casing that are involved cause indications of the displacement meter that are in no relation whatsoever to the pressure to be measured.

The errors introduced in this way are far from neglectable, because on the one hand the casing and the push rod have to be rather long because of the heating and cooling mantles of the machine and in order to protect the displacement meter against the high temperature of the machine, and on the other hand the deformations of the pressure feeler, which is rather rigid in order to be able to resist the high pressures, are very small and of the same order of magnitude as the relative changes in length of the push rod. This explains why with pressure gauges known in the art measuring errors of 50 percent can occur.

Pressure gauges are known in the art that do not have the great temperature sensitivity described. This effect has been achieved, however, by accepting a utility that is decreased from a practical point of view or by applying a more expensive and more vulnerable construction, which make these pressure gauges less suitable for production machines.

The object of the invention is to realize a pressure gauge with a considerably decreased temperature sensitivity without departing from the principle of the type of pressure gauge described and without applying a construction that is more expensive, more vulnerable or requires more care.

For this purpose the pressure gauge according to the invention is characterized in that the push rod is hollow, its wall-thickness is small with respect to its diameter and there is only a slight clearance between the push rod and the inner side of the casing.

These measures cause on the one hand that the heat capacity of the push rod is decreased, so that for a certain change in temperature less heat need to be transmitted between the casing and the push rod, and on the other hand that the transport of heat has to overcome less resistance.

These two conditions jointly decrease the occurring differences in temperature between the casing and the push rod.

The residual temperature sensitivity of the pressure gauge is less in proportion as the wall-thickness of the push rod and the clearance between the push rod and the casing are smaller. In order to avoid an unnecessary manufacture and yet to realize an accuracy sufficient for production machines, the pressure gauge according to the invention is further characterized in that the wall-thickness of the push rod is less than 15 percent of the diameter and in that the average clearance between the push rod and the casing is less than 0.5 mm.

A further decrease in temperature sensitivity can be still obtained if according to another characteristic of the pressure gauge according to the invention the wall-thickness of the casing is more than twice the wall-thickness of the push rod. With such a pressure gauge the push rod reacts more rapidly to changes in temperature of the casing than the casing reacts to changes in the environment, so that the changes in temperature of the casing can more easily be followed by the push rod.

The changes in temperature of the casing can be furthermore slowed down and hence be made easier to follow for the push rod by enclosing at least a part of the casing by a coaxial tubular member whose inside diameter is larger than the outside diameter of the casing. This member reduces the exchange of heat between the casing and the surroundings so that the reaction time of the casing to changes in the environment is extended.

A still further improvement is obtained if according to another characteristic of the pressure gauge according to the invention the clearance between the push rod and the casing is filled with a liquid. The liquid improves the transmission of heat and reduces the differences in temperature between the casing and the push rod.

For this purpose it is necessary, though, that the clearance is very small; with a bigger clearance the amount of liquid is also larger and the heat capacity of this amount of liquid can exert an adverse effect on the thermic properties of the pressure gauge.

The example of a pressure gauge according to the invention that is shown in the drawing is described below by way of further explanation.

The drawing shows in

FIG.1—the pressure gauge partly in view and partly in longitudinal section, and

FIG.2—the part of the pressure gauge indicated by line II in FIG.1, on an enlarged scale.

Casing 1, whose outer side 2 and inner side 3 are both cylindrical is closed at its lower end with thin-walled cylinder 4 and membrane 5, which together form the pressure feeler of the pressure gauge.

On the upper side of casing 1 displacement meter 7 is attached via cooling member 6. Feeler 8 of the former is connected with the upper end of hollow push rod 9, which with its closed lower end rests upon the centre of membrane 5.

Casing 1 at its lower end is provided with thrust collar 10 and between thrust collar 10 and cooling member 6 enclosed by sleeve 11, which, with its inner side 12, is at some distance from outer side 2 of casing 1. With the aid of screw thread 13 on the lower part of sleeve 11 casing 1 of the pressure gauge is attached into wall 14 of the machine in which the material with the pressure to be measured is present. For this purpose sleeve 11 is screwed into tapped hole 15, thrust collar 10 being clamped on to bottom 16 of tapped hole 15 and cylinder 4 with membrane 5 reaching as far as the inner side of wall 14 via the smaller bore 17.

Owing to the pressure of the mass within wall 14 membrane 5 is bent and cylinder 4, if to a lesser extent, is compressed longitudinally over a distance that is greater in proportion as the pressure on membrane 5 is greater. These two deformations yield a corresponding displacement of push rod 9 that is transmitted to feeler 8 of displacement meter 7 and results in a measuring value depending on the pressure.

Because casing 1 and push rod 9 consist of the same material, they are subject to the same change in length at an equal change in temperature and then the measuring value of displacement 7 is not affected.

When casing 1 and push rod 9 do not have the same temperature, however, there is a difference in length between these two, which is met by displacement meter 7 in the same way as a deformation of membrane 5 and hence results in a measuring error.

Differences in temperature between casing 1 and push rod 9 may occur, when the ambient temperature of the pressure gauge changes, for example as a result of switching on and off of the heating or cooling of wall 14 of the machine. The changed ambient temperature changes the temperature of casing 1, too, and this in its turn causes a change in the temperature of push rod 9. For this latter change an exchange of heat between casing 1 and push rod 9 is needed and this requires a difference in temperature, so that ultimately a measuring error results.

The pressure gauge described is designed such that the differences in temperature between casing 1 and push rod 9 and accordingly also the measuring errors are small. To this end push rod 9 is hollow and it has a wall-thickness as low as possible in order to make the heat content and hence also the transmission of heat and the difference in temperature involved as slight as possible. Moreover, the distance between the outer side of push rod 9 and the inner side 3 of casing 1 have been chosen small, in order to obtain an adequate transmission of heat and a further decrease in the differences in temperature.

For a still further decrease of the differences in temperature the wall-thickness of casing 1 has been chosen higher than that of push rod 9, so that the changes in the ambient temperature are followed less easily by casing 1 than the changes in temperature of casing 1 are followed by push rod 9. Owing to this the exchange of heat between casing 1 and push rod 9 is allowed to take place more slowly, which again means a decrease of the undesirable differences in temperature. Moreover, sleeve 11, whose wall-thickness is higher than that of casing 1, causes a further slowness in the temperature changes that casing 1 is subject to, due to environmental changes, and a corresponding reduction in the measuring errors.

The pressure gauge described has the following dimensions that are important for the thermic properties:
Inner diameter of casing 1 — 8 mm
Gap between casing 1 and push rod 9 — 0.1 mm
Wall-thickness of push rod 9 — 0.65 mm
Wall-thickness of casing 1 — 1.75 mm
Gap between casing 1 and sleeve 11 — 0.25 mm
Wall-thickness of sleeve 11 — 4 mm It has been found that this pressure gauge has a thermic sensitivity that under normal operational conditions does not exceed 2 to 3 percent of the measuring range, and for the use of the pressure gauge on production machines is quite acceptable.

I claim:

1. A pressure gauge useful for measurements during extrusion and injection moulding of thermoplastic materials and similar materials, comprising a substantially tubular casing, a pressure responsive means closing said casing at its one end and deforming elastically under the influence of the pressure to be measured, a displacement meter containing a feeler means and provided at the other end of said casing, and a push rod coaxial within the inner wall of said casing and connecting said feeler means of said displacement meter with said pressure responsive means, said feeler means closing that end of said push rod opposite to said pressure responsive means, said push rod is hollow, its wall-thickness is less than 15 percent of its diameter, and there is only a slight clearance between said push rod and the inner wall of said casing.

2. A pressure gauge according to claim 1, wherein the average clearance between said push rod and said casing is less than 0.5 mm.

3. A pressure gauge according to claim 2, wherein the clearance between said push rod and said casing is filled with a liquid.

4. A pressure gauge according to claim 1, wherein the wall-thickness of said casing is more than twice the wall-thickness of said push rod.

5. A pressure gauge according to claim 4, wherein a part of said casing is enclosed by a coaxial tubular member whose inside diameter is greater than the outside diameter of said casing.

* * * * *